USO07127217B2

(12) United States Patent
Tuttle et al.

(10) Patent No.: US 7,127,217 B2
(45) Date of Patent: Oct. 24, 2006

(54) ON-CHIP CALIBRATION SIGNAL GENERATION FOR TUNABLE FILTERS FOR RF COMMUNICATIONS AND ASSOCIATED METHODS

(75) Inventors: G. Tyson Tuttle, Austin, TX (US); Dan B. Kasha, Salt Lake City, UT (US)

(73) Assignee: Silicon Laboratories Inc., Austin, TX (US)

( * ) Notice: Subject to any disclaimer, the term of this patent is extended or adjusted under 35 U.S.C. 154(b) by 0 days.

(21) Appl. No.: 11/081,959

(22) Filed: Mar. 16, 2005

(65) Prior Publication Data

US 2006/0001559 A1    Jan. 5, 2006

Related U.S. Application Data

(63) Continuation-in-part of application No. 10/881,926, filed on Jun. 30, 2004.

(51) Int. Cl.
H04B 1/40 (2006.01)
(52) U.S. Cl. .................. 455/87; 455/3.01; 455/3.06; 455/120; 455/125
(58) Field of Classification Search ............. 341/118, 341/120, 144, 155; 455/121, 125, 87, 266, 455/340, 323, 307, 318, 265, 192.1; 375/344, 375/350, 316, 343
See application file for complete search history.

(56) References Cited

U.S. PATENT DOCUMENTS

| | | | |
|---|---|---|---|
| 3,931,578 A | 1/1976 | Gittinger | 325/461 |
| 4,484,221 A | 11/1984 | Tults | 358/191.1 |
| 4,551,856 A | 11/1985 | Victor et al. | 455/183 |
| 5,914,633 A | 6/1999 | Comino et al. | 327/553 |
| 5,983,088 A | 11/1999 | Aschwanden | 455/188.2 |
| 6,134,282 A * | 10/2000 | Ben-Efraim et al. | 375/350 |
| 6,166,594 A * | 12/2000 | Nielsen et al. | 329/319 |
| 6,205,183 B1 | 3/2001 | Dent | 375/261 |
| 6,356,142 B1 | 3/2002 | Mittel | 327/553 |
| 6,370,368 B1 | 4/2002 | Kianush | 455/264 |
| 6,407,376 B1 * | 6/2002 | Korn et al. | 250/227.23 |
| 6,539,066 B1 | 3/2003 | Heinen | 375/334 |
| 6,567,654 B1 | 5/2003 | Coronel Arredondo et al. | 455/315 |
| 6,647,075 B1 | 11/2003 | Genrich | 375/316 |
| 6,670,861 B1 * | 12/2003 | Balboni | 332/103 |

(Continued)

OTHER PUBLICATIONS

Allegri et al., "Single-Chip PLL-FM-Receiver," Swiss Federal Institute of Technology Zurich, Integrated Systems Laboratory, Winter Semester 1997/98, pp. 1-124, no month.

(Continued)

Primary Examiner—Linh Nguyen
(74) Attorney, Agent, or Firm—O'Keefe, Egan & Peterman, LLP (57) ABSTRACT

On-chip calibration signal generation circuitry is disclosed for filter tuning for radio-frequency communications and associated methods. On-chip circuitry generates a calibration signal that is used to help set a tuning control signal that is received by a tunable front-end filter. In one embodiment, local oscillator (LO) generation circuitry is used to generate the calibration signal. In operation of this embodiment, the LO generation circuitry is tuned to the desired receive channel, or to a frequency at some offset value from the desired receive channel, and the output of the LO generation circuitry is then used as a calibration input signal for a tunable front-end filter. This calibration signal is passed through the receive path circuitry, and the resulting signal is then analyzed to help set a tuning control signal for the tunable front-end filter.

29 Claims, 6 Drawing Sheets

U.S. PATENT DOCUMENTS

| | | | |
|---|---|---|---|
| 6,766,150 B1* | 7/2004 | Johnson | 455/87 |
| 6,865,381 B1 | 3/2005 | Vorenkamp et al. | 455/307 |
| 2002/0115420 A1* | 8/2002 | Cheng | 455/333 |
| 2002/0151287 A1 | 10/2002 | Lindquist et al. | 455/183.1 |
| 2003/0017817 A1* | 1/2003 | Cowley | 455/323 |
| 2004/0063416 A1* | 4/2004 | Kuenen et al. | 455/313 |
| 2004/0176060 A1* | 9/2004 | Hara | 455/190.1 |
| 2004/0219884 A1* | 11/2004 | Mo et al. | 455/67.11 |
| 2005/0024252 A1 | 2/2005 | Ezell | 341/169 |
| 2005/0040909 A1 | 2/2005 | Waight et al. | 333/17.1 |

OTHER PUBLICATIONS

Philips Semiconductor Data Sheet No. TEA5711; TEA5711T, "AM/FM Stereo Radio Circuit," Sep. 1994.

Philips Semiconductor Data Sheet No. TEA5767HN, "Low-Power FM Stereo Radio For Handhald Applications," Nov. 12, 2003.

Philips Semiconductor Preliminary Data Sheet No. TEA5880TS, "Integrated FM Stereo Radio IC For Host Processor Tuning In Handheld Applications—Rev. 02," Apr. 26, 2004.

* cited by examiner

ON-CHIP CALIBRATION SIGNAL GENERATION FOR TUNABLE FILTERS FOR RF COMMUNICATIONS AND ASSOCIATED METHODS

RELATED APPLICATIONS

This application is a continuation-in-part application of the following co-pending application: application Ser. No. 10/881,926 entitled "INTEGRATED LOW-IF TERRESTRIAL AUDIO BROADCAST RECEIVER AND ASSOCIATED METHOD," which was filed on Jun. 30, 2004, the entire text and all contents for which is hereby expressly incorporated by reference in its entirety.

TECHNICAL FIELD OF THE INVENTION

This invention relates to input filter circuitry for radio-frequency communications. More particularly, the present invention relates to antenna filter calibration for radio-frequency receivers.

BACKGROUND

Radio frequency (RF) receivers are used in a wide variety of applications such as television, cellular telephones, pagers, global positioning system (GPS) receivers, cable modems, cordless phones, radios and other devices that receive RF signals. RF receivers typically require frequency translation or mixing. For example, with respect to FM audio broadcasts, FM radio receivers may translate one broadcast channel in the FM frequency band to an intermediate frequency. Within the United States, FM radios will typically translate FM audio signals, which are broadcast in 200 KHz channels in the frequency band from 88 MHz to 108 MHz, to an intermediate frequency of 10.7 MHz. FM demodulators and stereo decoders can then convert this 10.7 MHz IF signal to demodulated left and right audio signal that can be sent to stereo speakers. Although other countries will have different frequency bands and channel spacing, the reception of audio broadcast signals, such as FM audio broadcasts, is similarly accomplished using RF receivers.

The majority of typical RF receivers perform frequency translation or mixing using an oscillator and an analog multiplier or mixer. An oscillator will typically output a local oscillator (LO) signal in the form of a sine wave or periodic wave having a tuned frequency ($f_{LO}$). A mixer then mixes the RF input signal spectrum, which includes desired spectral content at a target channel having a particular center frequency ($f_{CH}$), with the LO signal to form an output signal having spectral content at frequencies equal to the sum and difference of the two input frequencies, namely $f_{CH}+f_{LO}$ and $f_{CH}-f_{LO}$. One of these components forms the channel center frequency translated to the desired IF frequency, and the other component can be filtered out. The oscillator can be implemented with a variety of circuits, including, for example, a tuned inductor-capacitor (LC) oscillator, a charge relaxation oscillator, or a ring oscillator.

With respect to prior systems that receive terrestrial audio broadcasts, external circuitry is often used to filter out unwanted parts of a signal spectrum that is received through an antenna. This external filter circuit, therefore, acts to tune, at least in part, the incoming signal to a desired channel or portion of the RF signal spectrum. For example, with respect to FM terrestrial audio broadcasts, this external filter will help tune the receiver to the desired FM channel. Typical solutions for this external filter circuitry include external LC filters including inductors that provide the inductance (L) and varactor diodes that provide a variable capacitance (C).

SUMMARY OF THE INVENTION

The present invention provides on-chip calibration signal generation circuitry for front-end filter tuning for radio-frequency communications and associated methods. In one embodiment, on-chip circuitry generates a calibration signal that is used to help set one or more tuning control signals that are used to tune a tunable front-end filter. Local oscillator (LO) generation circuitry can be used to generate the calibration signal. In operation for such an embodiment, the LO generation circuitry can first be tuned to the desired receive channel, or to a frequency at some offset value from the frequency of the desired receive channel, and the output from the LO generation circuitry can then be used as the calibration input signal for the tunable front-end filter. This calibration signal is processed by receive path circuitry where it is mixed with a mixing signal from the LO generation circuitry. The resulting signal is then analyzed by calibration control circuitry to set a tuning control signal for the tunable front-end filter. At least part of the calibration signal generation circuitry and the calibration control circuitry can also be integrated on the same integrated circuit. Still further, the tunable filter can be an LC filter formed by an inductor coupled to tunable capacitance circuitry. As described below, other features, variations and architectures can be implemented, if desired, and various related methods can be utilized, as well.

DESCRIPTION OF THE DRAWINGS

It is noted that the appended drawings illustrate only exemplary embodiments of the invention and are, therefore, not to be considered limiting of its scope, for the invention may admit to other equally effective embodiments.

DETAILED DESCRIPTION OF THE INVENTION

The present invention provides calibration signal generation circuitry for front-end filter tuning in integrated radio-frequency communication devices.

Figure 1A:
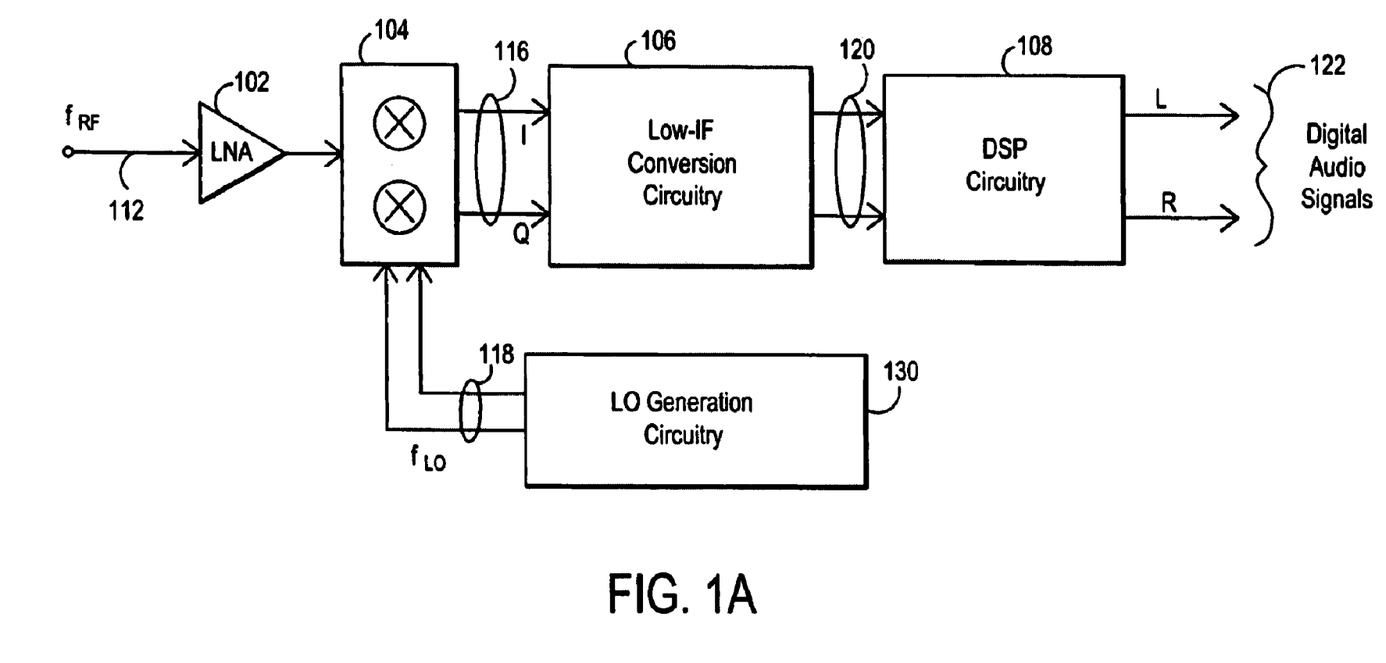
FIG. 1A is a block diagram of an embodiment for an integrated terrestrial broadcast receiver that utilizes a low-IF architecture.
Figure 1B:
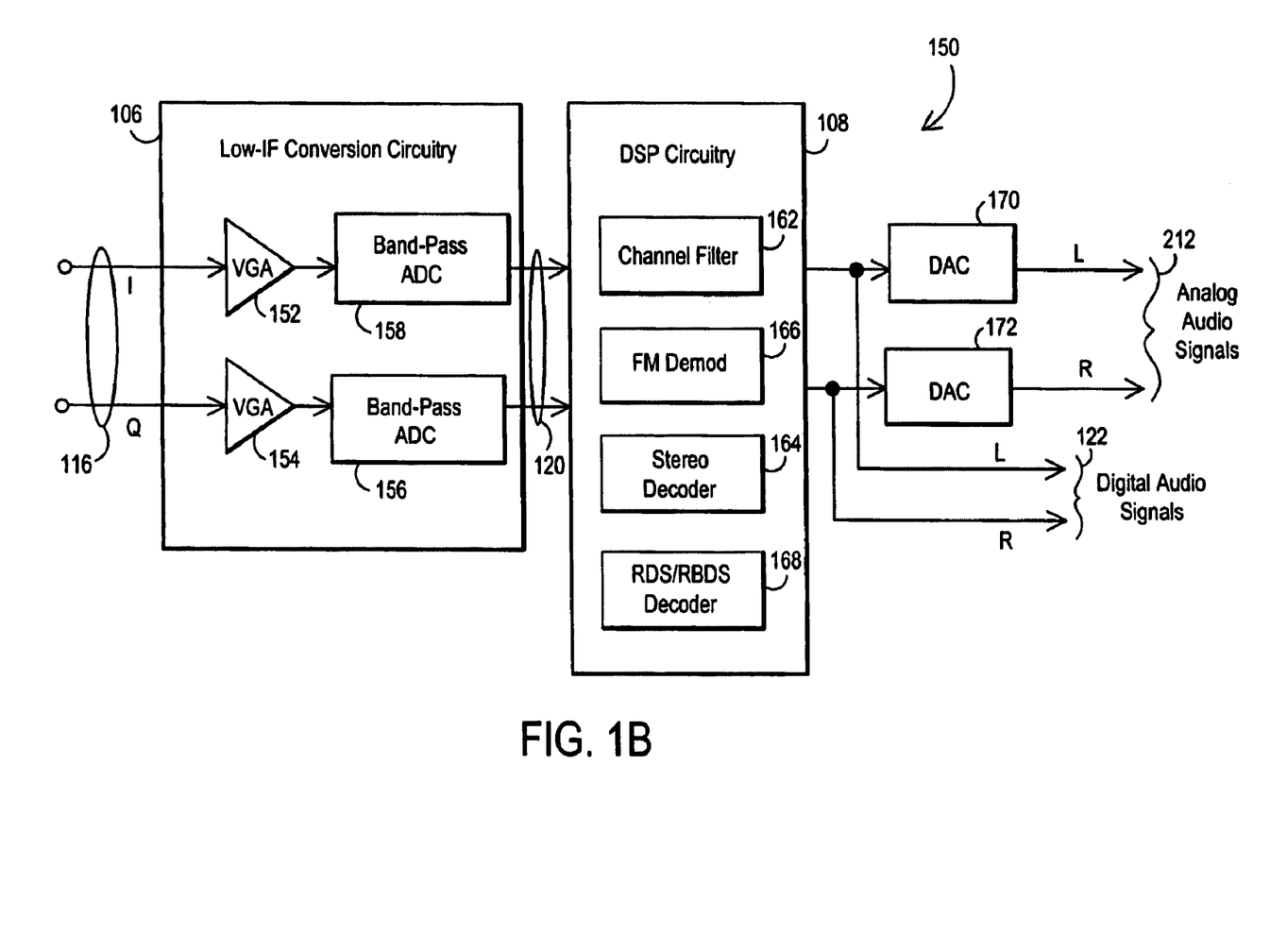
FIG. 1B is a further block diagram of an embodiment for an integrated terrestrial broadcast receiver.
Figure 1C:
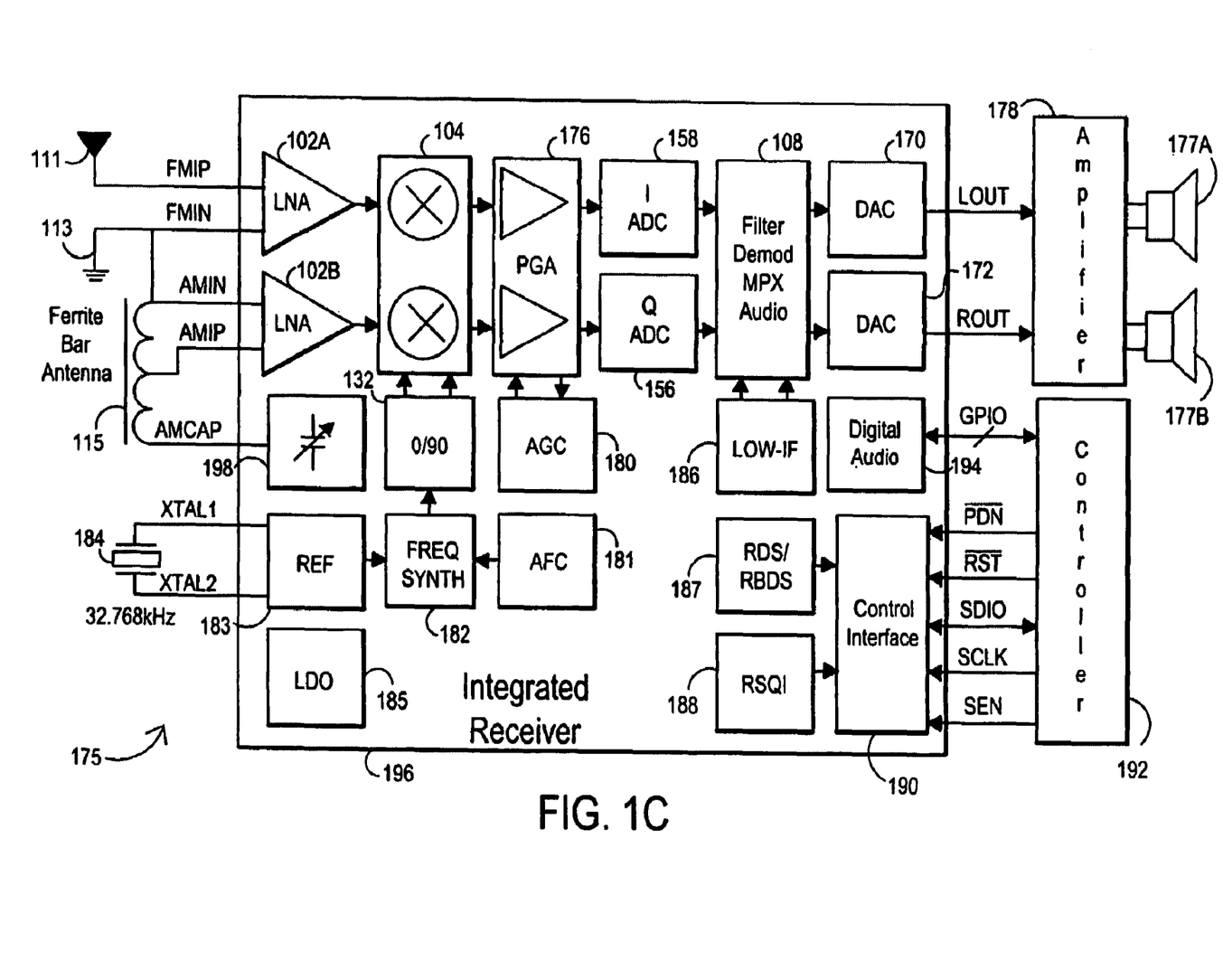
FIG. 1C is a more detailed block diagram of one example implementation for an integrated receiver including example external components.

As an initial matter, it is noted that the on-chip calibration signal generation circuitry of the present invention can be used with respect to a wide variety of integrated communication devices that utilize a filtered input signal. The low-intermediate-frequency (low-IF) integrated receiver embodiments discussed below with respect to FIGS. 1A–C represent example integrated communication devices that can take advantage of the on-chip calibration signal generation tuning circuitry of the present invention. FIGS. 2A, 2B, 3A, 3B and 4 provide example embodiments describing the on-chip calibration signal generation circuitry. It is noted that the present invention is not limited to the low-IF architectures depicted in FIGS. 1A-C and is equally applicable to other receiver architectures as well. It is further noted that the discussion below focuses on embodiments for terrestrial broadcasts receivers, and for FM or AM receivers in particular, and that these broadcast spectrums should be viewed only as examples.

FIG. 1A is a block diagram of an embodiment 100 for an integrated terrestrial broadcast receiver that utilizes a low-IF architecture. The input signal spectrum ($f_{RF}$) 112 is expected to be a radio frequency (RF) signal spectrum that includes a plurality of channels that can be tuned. It is noted that as used herein, a "radio frequency" or RF signal means an electrical signal conveying useful information and having a frequency from about 3 kilohertz (kHz) to thousands of gigahertz (GHz), regardless of the medium through which such signal is conveyed. Thus an RF signal may be transmitted through air, free space, coaxial cable, fiber optic cable, etc. More particularly, the present invention can provide an advantageous architecture for an FM terrestrial broadcast receiver. For purposes of the description below, therefore, the RF signal spectrum ($f_{RF}$) 112 will be discussed primarily with respect to the RF signal spectrum ($f_{RF}$) 112 being an FM terrestrial broadcast spectrum that includes a plurality of different FM broadcasts channels centered at different broadcast frequencies.

Looking back to the embodiment 100 in FIG. 1A, a low noise amplifier (LNA) 102 receives the RF signal spectrum ($f_{RF}$) 112. The output of the LNA 102 is then applied to mixer 104, and mixer 104 generates real (I) and imaginary (Q) output signals, as represented by signals 116. To generate these low-IF signals 116, the mixer 104 uses phase shifted local oscillator (LO) mixing signals ($f_{LO}$) 118. The LO generation circuitry 130 includes oscillation circuitry and outputs the two out-of-phase LO mixing signals ($f_{LO}$) 118 that are used by the mixer 104. The outputs of mixer 104 are at a low-IF, which can be designed to be fixed or may be designed to vary, for example, if discrete step tuning is implemented for the LO generation circuitry 130. An example of large step LO generation circuitry that utilizes discrete tuning steps is described in the co-owned and co-pending U.S. patent application Ser. No. 10/412,963, which was filed Apr. 14, 2003, which is entitled "RECEIVER ARCHITECTURES UTILIZING COARSE ANALOG TUNING AND ASSOCIATED METHODS," and which is hereby incorporated by reference in its entirety Low-IF conversion circuitry 106 receives the real (I) and imaginary (Q) signals 116 and outputs real and imaginary digital signals, as represented by signals 120. The low-IF conversion circuitry 106 preferably includes band-pass or low-pass analog-to-digital converter (ADC) circuitry that converts the low-IF input signals to the digital domain. And the low-IF conversion circuitry 106 provides, in part, analog-to-digital conversion, signal gain and signal filtering functions. Further digital filtering and digital processing circuitry with the digital signal processing (DSP) circuitry 108 is then used to further tune and extract the signal information from the digital signals 120. The DSP circuitry 108 then produces baseband digital output signals 122. When the input signals relate to FM broadcasts, this digital processing provided by the DSP circuitry 108 can include, for example, FM demodulation and stereo decoding. And the digital output signals 122 can be left (L) and right (R) digital audio output signals 122 that represent the content of the FM broadcast channel being tuned, as depicted in the embodiment 100 of FIG. 1A. It is noted that the output of the receiver 100 can be other desired signals, including, for example, low-IF quadrature I/Q signals from an analog-to-digital converter that are passed through a decimation filter, a baseband signal that has not yet be demodulated, multiplexed L+R and L−R audio signals, L and R analog audio signals, and/or any other desired output signals.

It is noted that as used herein low-IF conversion circuitry refers to circuitry that in part mixes the target channel within the input signal spectrum down to a fixed IF frequency, or down to a variable IF frequency, that is equal to or below about three channel widths. For example, for FM broadcasts within the United States, the channel widths are about 200 kHz. Thus, broadcast channels in the same broadcast area are specified to be at least about 200 kHz apart. For the purposes of this description, therefore, a low-IF frequency for FM broadcasts within the United States would be an IF frequency equal to or below about 600 kHz. It is further noted that for spectrums with non-uniform channel spacings, a low-IF frequency would be equal to or below about three steps in the channel tuning resolution of the receiver circuitry. For example, if the receiver circuitry were configured to tune channels that are at least about 100 kHz apart, a low-IF frequency would be equal to or below about 300 kHz. As noted above, the IF frequency may be fixed at a particular frequency or may vary within a low-IF range of frequencies, depending upon the LO generation circuitry 130 utilized and how it is controlled.

It is further noted that the architecture of the present invention can be utilized for receiving signals in a wide variety of signal bands, including AM audio broadcasts, FM audio broadcasts, television audio broadcasts, weather channels, and other desired broadcasts. The following table provides example frequencies and uses for various broadcast bands that can be received by the integrated terrestrial broadcast receiver of the present invention.

TABLE 1

EXAMPLE FREQUENCY BANDS AND USES

| FREQUENCY | USES/SERVICES |
| --- | --- |
| 150–535 kHz | European LW radio broadcast |
|  | 9 kHz spacing |
| 535–1700 kHz | MW/AM radio broadcast |
|  | US uses 10 kHz spacing |
|  | European uses 9 kHz spacing |
| 1.7–30 | SW/HF international radio broadcasting |
| 46–49 | Cordless phones and 'baby monitors', remote control |
| 59.75 (2) | US TV Channels 2–6 (VHF_L) |
| 65.75 (3) | 6 MHz channels at 54, 60, 66, 76, 82 |
| 71.75 (4) | Audio carrier is at 5.75 MHz (FM MTS) |
| 81.75 (5) |  |
| 87.75 (6) |  |
| 47–54 (E2) | European TV |
| 54–61 (E3) | 7 MHz channels, FM sound |
| 61–68 (E4) | Band I: E2–E4 |
| 174–181 (E5) | Band III: E5–E12 |
| 181–188 (E6) |  |
| 188–195 (E7) |  |

TABLE 1-continued

EXAMPLE FREQUENCY BANDS AND USES

| FREQUENCY | USES/SERVICES |
|---|---|
| 195–202 (E8) | |
| 202–209 (E9) | |
| 209–216 (E10) | |
| 216–223 (E11) | |
| 223–230 (E12) | |
| 76–91 | Japan FM broadcast band |
| 87.9–108 | US/Europe FM broadcast band |
| | 200 kHz spacing (US) |
| | 100 kHz spacing (Europe) |
| 162.550 (WX1) | US Weather Band |
| 162.400 (WX2) | 7 channels, 25 kHz spacing |
| 162.475 (WX3) | SAME: Specific Area Message Encoding |
| 162.425 (WX4) | |
| 162.450 (WX5) | |
| 162.500 (WX6) | |
| 162.525 (WX7) | |
| 179.75 (7) | US TV Channels 7–13 (VHF_High) |
| | 6 MHz channels at 174, 180, 186, 192, 198, 204, 210 |
| 215.75 (13) | FM Sound at 5.75 MHz |
| 182.5 (F5) | French TV F5–F10 Band III |
| | 8 MHz channels |
| 224.5 (F10) | Vision at 176, 184, 192, 200, 208, 216 MHz |
| | AM sound at +6.5 MHz |
| 470–478 (21) | Band IV —TV Broadcasting |
| | Band V - TV Broadcasting |
| 854–862 (69) | 6 MHz channels from 470 to 862 MHz |
| | UK System I (PAL): |
| | Offsets of +/−25 kHz may be used to alleviate co-channel interference |
| | AM Vision carrier at +1.25 (Lower Sideband vestigial) |
| | FMW Sound carrier at +7.25 |
| | Nicam digital sound at +7.802 |
| | French System L (Secam): |
| | Offsets of +/−37.5 kHz may be used. |
| | AM Vision carrier at +1.25 (inverted video) |
| | AM Sound carrier at +7.75 |
| | Nicam digital sound at +7.55 |
| 470–476 (14) | US TV Channels 14–69 |
| | 6 MHz channels |
| 819–825 (69) | Sound carrier is at 5.75 MHz (FM MTS) |
| | 14–20 shared with law enforcement |

FIG. 1B is a more detailed block diagram for the low-IF circuitry 106 and the DSP circuitry 108 of FIG. 1A where the receiver circuitry is utilized for an integrated FM terrestrial broadcast receiver. More particularly, in the embodiment 150 of FIG. 1B, the low-IF circuitry 106 includes variable gain amplifiers (VGAs) 152 and 154 that receive the real (I) and imaginary (Q) signals 116 that have been mixed down to a low-IF frequency by mixer 104. The output of VGA 152 is then converted from low-IF to the digital domain using band-pass ADC 158. Similarly, the output of VGA 154 is converted from low-IF to the digital domain using band-pass ADC 156. Together, the ADCs 156 and 158 produce the real (I) and imaginary (Q) digital output signals 120. The DSP circuitry 108 conducts digital processing in the digital domain to further tune the target channel. More particularly, the low-IF DSP circuitry 108 utilizes a channel selection filter, as represented by the channel filter block 162, to further tune the target channel. As indicated above, the DSP circuitry 108 can also implement digital processing to provide FM demodulation of the tuned digital signals, as represented by FM DEMOD block 166, and can implement stereo decoding, such as MPX decoding, as represented by stereo decoder block 164. In addition, embodiment 150 can tune and decode RDS (Radio Data System) and/or RBDS (radio broadcast data System) information utilizing in part the RDS/RBDS decoder 168 within the DSP circuitry 108.

The output signals from the low-IF DSP circuitry 108 are left (L) and right (R) digital audio signals 122. If desired, integrated digital-to-analog converters (DACs), such as DACs 170 and 172, can be utilized to convert these digital audio signals to left (L) and right (R) analog audio signals 212. It is also noted that, if desired, ADCs 156 and 158 could also be implemented as complex bandpass ADCs, as real low-pass ADCs, or as any other desired ADC architecture.

As indicated above, the architectures of the present invention are advantageous for small, low-cost portable devices and are particularly advantageous for such devices that need to receive terrestrial audio broadcasts, such as FM broadcasts. In particular, the LO generation circuitry 130, the mixer 104, the low-IF conversion circuitry 106 and the DSP circuitry 108 are preferably all integrated on the same integrated circuit. In addition, the LNA 102 and other desired circuitry can also be integrated into the same integrated circuit. This integrated circuit can be made, for example, using a CMOS process, a BiCMOS process, or any other desired process or combination of processes. In this way, for example, a single integrated circuit can receive a terrestrial broadcast signal spectrum and output digital or analog audio signals related to a tuned terrestrial broadcast channel. Preferably, the integrated circuit is a CMOS integrated circuit, and preferably an integrated CMOS terrestrial broadcast receiver of the present invention is configured in a 4×4 mm 24-pin micro lead-frame (MLP) package to provide advantageous cost, size and performance features for small, portable devices, such as cellular handsets, portable audio devices, MP3 players, portable computing devices, and other small, portable devices.

Power consumption is an additional concern with such small, portable devices. The integrated receiver architecture of the present invention advantageously provides for reduced power consumption and allows for the use of power supplies with different ranges to power the integrated receiver. In particular, the present invention allows for low current consumption of less than or equal to 30 mA (milli-Amps) of supply current. In addition, the level of integration provided by the present invention allows for a small package size and reduced number of external components that is less than or equal to about six (6) external components.

FIG. 1C is a block diagram of one example embodiment 175 for an integrated terrestrial broadcast receiver 196. In the embodiment depicted, the integrated receiver 196 includes an AM antenna and an FM antenna. The FM antenna 111 provides a differential FM input signal, which is represented by signals FMIP (FM input positive) and FMIN (FM input negative), to a first low noise amplifier (LNA) 102A. The FMIN node is coupled to ground 113. The AM antenna 115 provides a differential AM input signal, which is represented by signals AMIP (AM input positive) and AMIN (AM input negative), to a second low noise amplifier (LNA) 102B. The AMIN node is coupled to ground 113. The AM antenna 115, as depicted, is a ferrite bar antenna, and the AM reception can be tuned using an on-chip variable capacitor circuit 198. The connection between the on-chip variable capacitor circuit 198 and the AM antenna 115 is represented by the AMCAP signal. It is also noted that the FM antenna reception can also be tuned with an on-chip variable capacitor circuit, if desired. With respect to the power supply for the integrate receiver 196, an integrated supply regulator (LDO) block 185 can be provided to help regulate the on-chip power.

As with FIG. 1A, the outputs of the LNAs 102A and 102B are processed by mixer 104 to generate real (I) and an imaginary (Q) signals. These signals are then processed by a programmable gain amplifier (PGA) 176, which is controlled by the automatic gain control (AGC) block 180. The output signals from the PGA 176 are then converted to digital I and Q values with I-path ADC 158 and Q-path ADC 156. DSP circuitry 108 then processes the digital I and Q values to produce left (L) and right (R) digital audio output signals that can be provided to the digital audio block 194. In addition, these left (L) and right (R) digital audio output signals can be processed with additional circuitry, as represented by digital-to-analog conversion (DAC) circuits 170 and 172, to produce left (LOUT) and right (ROUT) analog output signals. These analog output signals can then be output to listening devices, such as headphones. Amplifier 178 and speaker outputs 177A and 177B, for example, can represent headphones for listening to the analog audio output signals. As described above with respect to FIG. iB, the DSP circuitry 108 can provide a variety of processing features, including digital filtering, FM and AM demodulation (DEMOD) and stereo/audio decoding, such as MPX decoding. Low-IF block 186 includes additional circuitry utilized to control the operation of the DSP circuitry 108 in processing the digital I/Q signals.

A digital control interface 190 can also be provided within integrated receiver 196 to communicate with external devices, such as controller 192. As depicted, the digital communication interface includes a power-down (PDN_) input signal, reset (RST_) input signal, a bi-directional serial data input/output (SDIO) signal, a serial clock input (SCLK) signal, and a serial interface enable (SEN) input signal. As part of the digital interface, digital audio block 194 can also output digital audio signals to external devices, such as controller 192. As depicted, this communication is provided through one or more general programmable input/output (GPIO) signals. The GPIO signals represent pins on the integrated receiver 196 that can be user programmed to perform a variety of functions, as desired, depending upon the functionality desired by the user. In addition, a wide variety of control and!or data information can be provided through the interface 190 to and from external devices, such as controller 192. For example, a RDS/RBDS block 187 can report relevant RDS/RBDS data through the control interface 190. And a receive strength quality indicator block (RSQI) 188 can analyze the receive signal and report data concerning the strength of that signal through the control interface 190. It is noted that other communication interfaces could be used, if desired, including serial or parallel interfaces that use synchronous or asynchronous communication protocols.

Looking back to the mixer 104 of FIG. 1C, LO mixing signals are received by mixer 104 from a phase shift block (0/90) 132 that produces two mixing signals that are 90 degrees out of phase with each other. The phase shift block 132 receives an oscillation signal from frequency synthesizer (FREQ SYNTH) 182. Frequency synthesizer 182 receives a reference frequency from reference frequency (REF) block 183 and a control signal from automatic frequency control (AFC) block 181. An external crystal oscillator 184, operating, for example, at 32.768 kHz, provides a fixed reference clock signal to the reference frequency (REF) block 183 through connections XTAL1 and XTAL2. The AFC block 181 can receive tuning error signal from the receive path circuitry within the integrate receiver 196 and provide a correction control signal to the frequency synthesizer 182. The use of such an error correction signal is discussed in further detail below.

FIGS. 2A, 2B, 3A, 3B and 4 provide example embodiments describing the on-chip filter tuning circuitry and on-chip tuning calibration signal generation circuitry. It is again noted that the tuning circuitry and the on-chip calibration signal generation circuitry of the present invention can be used with respect to a wide variety of integrated communication devices that utilize filtered signals. For example, other receive path architectures could be utilized, such as more traditional architectures where the input signal spectrum is mixed to IF and then mixed down to baseband with second mixer circuitry.

Figure 2A:
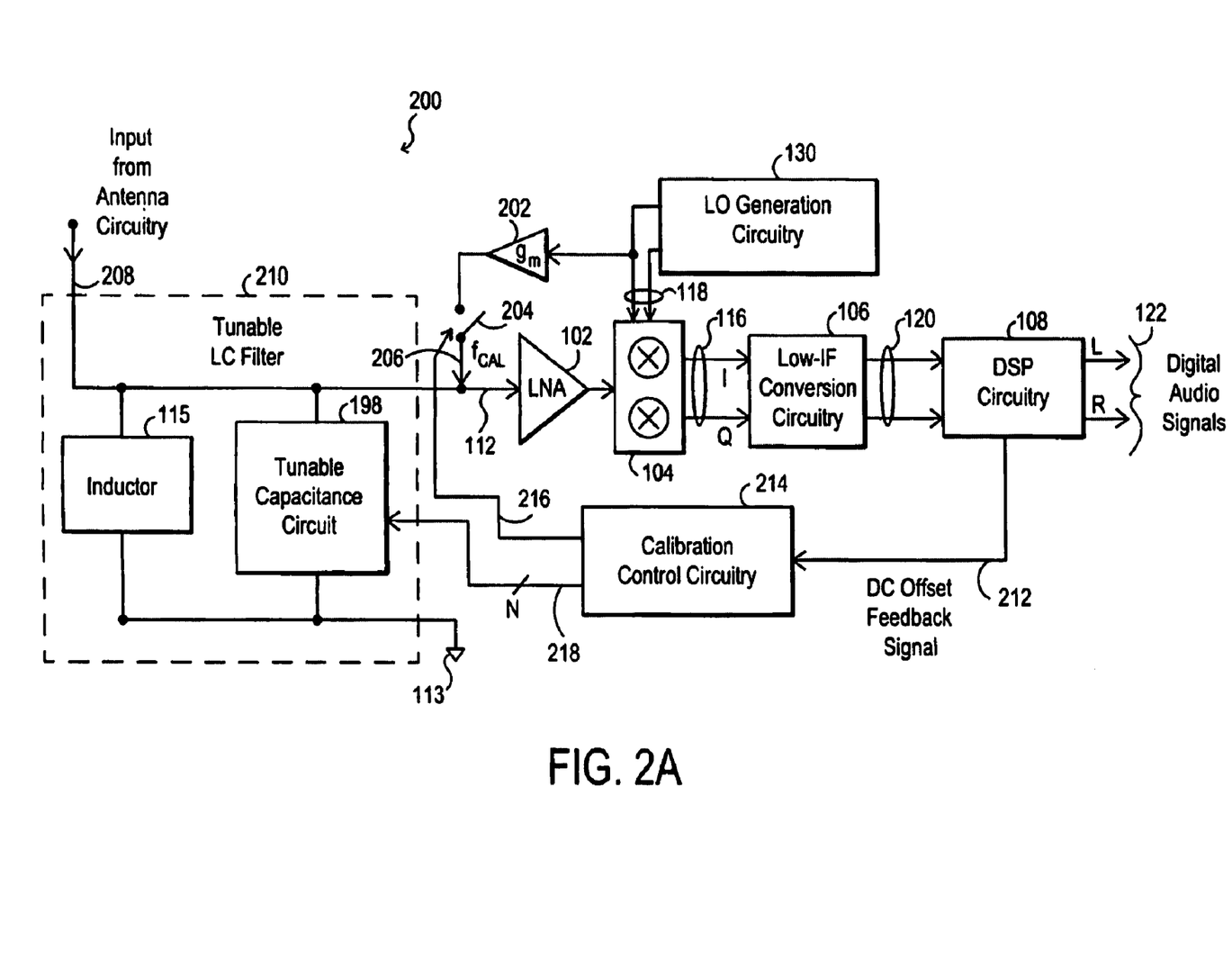
FIG. 2A is a block diagram for a tunable LC filter for an integrated receiver where portions of the tunable LC filter and related circuitry are integrated on a single chip.

FIG. 2A is a block diagram for a tunable LC filter 210 for an integrated receiver where portions of the tunable LC filter 210, including a tunable capacitance circuit 198, are integrated on-chip. As discussed above, this receiver circuitry can be any desired integrated receiver circuitry that utilizes a signal coupled to a filter. As depicted in the embodiment of FIG. 2A and as described with respect to FIGS. 1A–C, the integrated receiver circuitry can be designed to provide a low-IF receive path architecture. The LNA 102 outputs a signal to mixer 104. Mixer 104 receives mixing signals from LO generation circuitry 130 and outputs real (I) and imaginary (Q) signals 116 to the low-IF conversion circuitry. The low-IF conversion circuitry processes these signals and provides real and imaginary digital signals, as represented by signals 120, to DSP circuitry 108. The DSP circuitry processes these signals and outputs left (L) and right (R) digital audio signals 122.

In the embodiment 200 depicted, the tunable LC filter 210 receives an input 208 from antenna circuitry and outputs signal 112 to the integrated receiver circuitry. The inductor 115 and the tunable capacitance circuit 198 are coupled in parallel between signal line 112 and ground 113 to form an LC filter. The tunable capacitance circuit 198 is controlled by one or more control signals provided by calibration control circuitry 214. This control signal can be, for example, an N-bit digital control signal 218, as depicted in FIG. 2A. The calibration control circuitry 214 also provides a control signal 216 that opens or closes switch 204 in order to inject a calibration signal ($f_{CAL}$) 206 to the LNA 102 during calibration operational modes. The injected calibration signal ($f_{CAL}$) 206 can be generated, as desired, and once injected, the tunable LC filter 210 is adjusted so that the filter response tends to maximize the strength of the injected signal. As depicted, the calibration signal ($f_{CAL}$) 206 is generated using the mixing signals 118 from the LO generation circuitry 130. In particular, one of these signals 118 is passed through a transconductance amplifier ($g_m$) 202 and then through switch 204 to provide the calibration signal ($f_{CAL}$) 206. The receive path circuitry processes this injected signal 206 resulting in a DC offset feedback signal 212 being generated as an output from the DSP circuitry 108. This feedback signal 212 provides an indication of the signal strength of the injected signal 206. It is noted that a differential implementation could also be utilized, if desired. It is further noted that the transconductance amplifier ($g_m$) 202 is included in the example of FIG. 2A to provide a high impedance drive circuit to connect the calibration signal 206 to the LC filter 210. The transconductance amplifier, therefore, acts as calibration signal drive circuitry 202 that drives the calibration signal 206 through switch 204 to signal line 112 and the tunable filter 210. Other amplifier topologies could be utilized, as desired, to generate calibration signal 206.

In a calibration mode of operation for the integrated receiver, the calibration control circuitry 214 sets the tuning control signal 218 to a nominal or selected value and activates control signal 216 to close the switch 204. In addition, the LO generation circuitry 130 is operated to produce the mixing signals 118 for the desired channel to be tuned. The amplifier ($g_m$) 202 then drives the calibration signal ($f_{CAL}$) 206. And this calibration signal ($f_{CAL}$) 206 is injected into the receive path through switch 204. The calibration control circuitry 214 then receives back the DC offset feedback signal 212 as an indication of signal strength for the injected calibration signal ($f_{CAL}$) 206. The calibration control circuitry 214 then adjusts the tuning control signal 218 and determines what affect the adjustments had on the signal strength as represented by feedback signal 212. The calibration control circuitry 214 continues these tuning adjustments until the signal strength has been adjusted, improved and/or optimized. At this point, the calibration mode is complete, and the calibration control circuitry deactivates control signal 216 thereby opening the switch 204 and disconnecting the calibration signal ($f_{CAL}$) 206 from the receive path circuitry.

It is noted that for this embodiment, the calibration signal ($f_{CAL}$) 206 is configured to match the frequency of the mixing signals 118 provided by the LO generation circuitry 130, which may be set to the desired channel frequency, to a frequency offset by some selected value from the desired channel frequency, or any other desired frequency. It is noted that the calibration signal ($f_{CAL}$) 206 could be generated using different internal circuitry and techniques if so desired. In other words, although the LO generation circuitry 130 provides an efficient source for this on-chip calibration signal ($f_{CAL}$) 206, other on-chip circuitry could be used to generate this calibration signal, if desired. In operation, therefore, the calibration signal ($f_{CAL}$) 206 is input to LNA 102 and then provided to mixer 104. Calibration signal ($f_{CAL}$) 206, which is configured such that it matches the mixing signals 118, is in effect mixed with itself by mixer 104 so as to produce a DC output. This DC output can then be analyzed using other circuitry, such as conversion circuitry 106 and DSP circuitry 108, to adjust, improve and/or optimize the tuning for the tunable filter 210. For example, when the DC output from the mixer 104 is maximized it can be concluded that that center frequency for the tunable filter 210 has been tuned to the mixing signals 118. It is again noted that a wide variety of tuning algorithms could be implemented, as desired, within the calibration control circuitry 214.

Figure 2B:
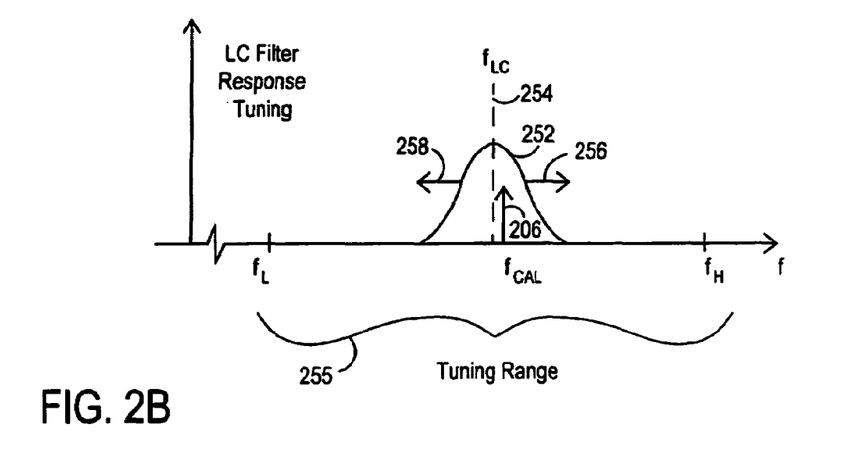
FIG. 2B is a graphical diagram showing the LC filter response being adjusted with respect to an injected signal in order to calibrate the LC filter response.

FIG. 2B is a graphical diagram representing LC filter response tuning in which the LC filter response 252 is being tuned with respect to an injected signal 206 in order to calibrate the LC filter response. The tuning range 255 for the LC filter falls between a low frequency ($f_L$) and a high frequency ($f_H$). The LC filter frequency response, as represented by response 252, has a center frequency ($f_{LC}$) that is represented by dotted line 254. By adjusting the tuning control signal, the response 252 is moved up or down within the tuning range 255 for the LC filter, as represented by arrows 256 and 258, respectively. The injected calibration signal ($f_{CAL}$) is represented by arrow 206. And the injected calibration signal ($f_{CAL}$) 206 will strengthen as it is aligned closer and closer to the center frequency ($f_{LC}$) for the LC filter response 252. In operation, therefore, the calibration control circuitry 214 is attempting to improve and/or optimize the strength of injected calibration signal ($f_{CAL}$) 206 and thereby calibrate the LC filter response for a desired channel. As discussed above, the strength of the injected calibration signal ($f_{CAL}$) is utilized as an indication of the position of the LC filter response with respect to a particular frequency.

It is also noted that calibration signal ($f_{CAL}$) 206 does not have to match the desired channel to be tuned. In other words, if the tunable filter is desired to be tuned for a particular channel frequency, the calibration signal ($f_{CAL}$) 206 can be brought to a frequency that is offset from the desired channel frequency by some amount. For example, the calibration signal ($f_{CAL}$) 206 can be made to fall within the 3 db point for the tunable filter 210 while still maintaining performance. Other modifications could be made, as well, depending upon the circuitry implemented for the receiver architecture and the tunable filter. With respect to the low-IF architecture discussed above with respect to FIGS. 1A–1C, the LO mixing signals 118 from the LO generation circuitry 130 that would be used to receive the desired channel can also be utilized as the calibration signal without adjusting the frequency. For example, where the IF is 100 kHz and where the tunable filter 210 has a 3 db point that is wider than 100 kHz, the mixing signals 118 that would be used to receive a desired channel can be used as the calibration signal. In this way, the calibration signal ($f_{CAL}$) 206 will be 100 kHz from the desired channel frequency but performance will still be acceptable.

It is noted that the calibration mode could be entered each time a new channel is tuned. It is further noted that any desired tuning algorithm could be implemented for adjusting the tuning control signal 218. For example, successive approximation techniques could be utilized, if desired. In addition, it is noted that the initial state for the tuning control signal 218 may be selected, as desired. For example, a nominal value in the middle of the tuning range could be used. In addition, data points could be stored that represent the last tuning value utilized for a particular channel. When that channel is again selected, the tuning value stored for that channel can be used. Still further, it is noted that the inductor 115 could be configured as a tunable circuit, as well. In such case, the calibration control circuitry 214 would also control the tunable inductor through an appropriate control signal. It is noted other implementations and circuitry could be utilized, if desired.

The algorithm for utilizing the on-chip calibration signal ($f_{CAL}$) 206 can be implemented, as desired. One example algorithm utilizing LO generation circuitry 130 to provide the calibration signal is the following:
1. Determine the desired channel to be received.
2. Tune the LO generation circuitry 130 to the frequency of the desired channel, to the frequency that will be used to receive the desired channel, or to some other frequency offset from the desired channel.
3. Utilize mixing signals 118 from the LO generation circuitry 130 to drive a calibration signal ($f_{CAL}$) 206 applied to the tunable filter circuitry 210 and the receive path circuitry.
4. Mix the calibration signal ($f_{CAL}$) 206 with the mixing signals 118 (i.e., mixing the calibration signal ($f_{CAL}$) 206 with itself).
5. Analyze or optimize the DC signal from the mixer to set a tuning control signal 218 for the tunable filter circuitry 210.
6. Tune the LO generation circuitry 130 to the frequency that will be used by the receive path circuitry to receive the desired channel, if not already tuned to this frequency.
7. Receive the desired channel.

Figure 3A:
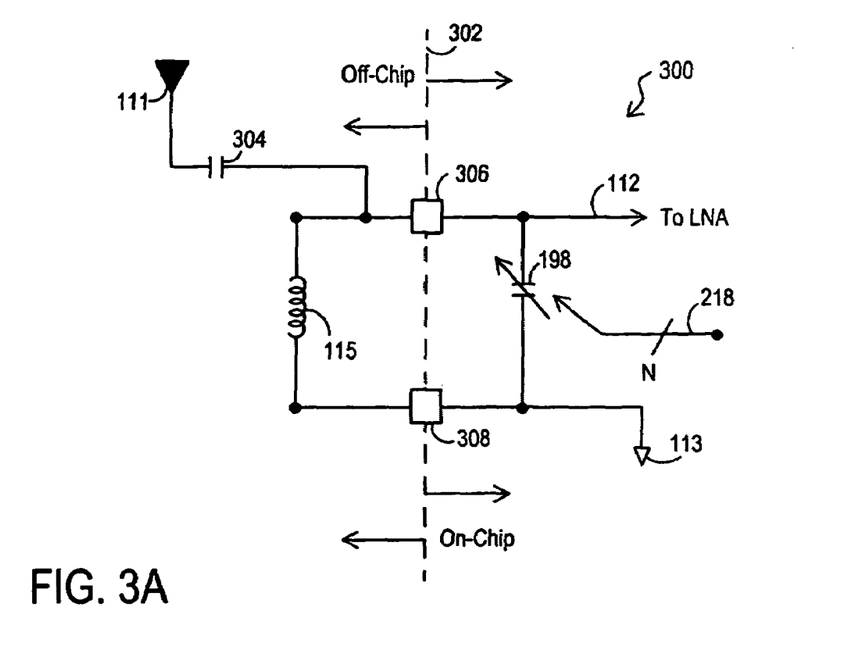
FIG. 3A is a schematic diagram of an example embodiment for the tunable LC filter where an inductor is off-chip and the tunable capacitance circuit is on-chip.

FIG. 3A is a block diagram of an example embodiment 300 for the tunable LC filter where an inductor 115 is off-chip, and the tunable capacitance circuit 198 is on-chip. The dotted line 302 represents the chip boundary, and blocks 306 and 308 represent input pins to the integrated circuit. The antenna 111 is connected through capacitor 304 to inductor 115 and the input 306. The inductor 115 is connected between inputs 306 and 308. The tunable capacitance circuit 198 is located on-chip and is connected in parallel with inductor 115 between inputs 306 and 308. As depicted, input 308 is coupled to ground, and input 306 is coupled to provide the input signal 112 to the LNA 102. The tunable capacitance circuit 198 is controlled by tuning control signal 218, which can be an N-bit digital control signal, as discussed above. It is noted that the inductor 115 can be implemented as any desired inductance. Where the inductor 115 is implemented as a bar antenna, loop stick or loop antenna, the inductor 115 can serve as the antenna, for example, as might be utilized for AM reception. In such an implementation the antenna 111 can be eliminated, if desired. It is further noted that FIG. 1C provides an embodiment includes a ferrite bar antenna 115 as an AM antenna.

Figure 3B:
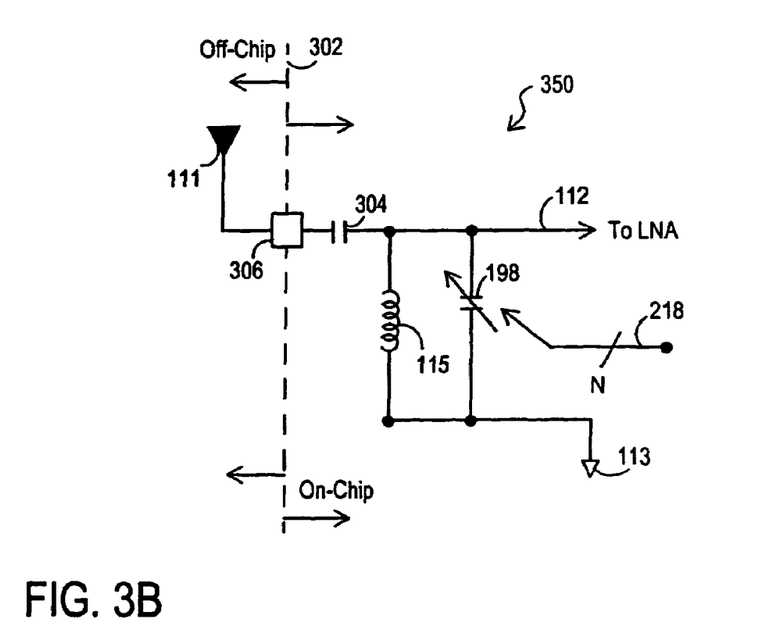
FIG. 3B is a schematic diagram of another example embodiment for the tunable LC filter where an inductor and the tunable capacitance circuit is on-chip.

FIG. 3B is a block diagram of another example embodiment 350 for the tunable LC filter where an inductor 115 and the tunable capacitance circuit 198 are on-chip. The dotted line 302 represents the chip boundary, and block 306 represents an input pin to the integrated circuit. The antenna 111 is connected to input 306 and then to an on-chip capacitor 304. Inductor 115 and the tunable capacitance circuit 198 are coupled in parallel between the signal line 112 and ground 113. The tunable capacitance circuit 198 is again controlled by tuning control signal 218, which can be an N-bit digital control signal, as discussed above.

It is noted that FIGS. 3A and 3B provide example embodiments. A wide variety of other configurations and implementations could be utilized with the present invention. For example, differential implementations could be implemented where signal line 112 and signal line 113 would be coupled as inputs to an LNA. It is also noted that the coupling capacitor 304 in FIGS. 3A and 3B is not required and can be eliminated if desired. And it is noted that additional on-chip or off-chip inductances and capacitances could be utilized to make up an LC tank either alone or in combination with the inductor 115 and the on-chip tunable capacitance circuit 198, according to the present invention. In addition, control signals for the inductance and capacitance circuits can be provided from on-chip or off-chip circuitry, as desired. It is further noted that portions of the circuitry are preferably integrated on a single integrated circuit. For example, the mixer 104, the LO generation circuitry 130, the conversion circuitry 106, the DSP circuitry 108, the calibration signal drive circuitry 202 and/or the calibration control circuitry 214 can be at least in part integrated on the same integrated circuit.

Figure 4:
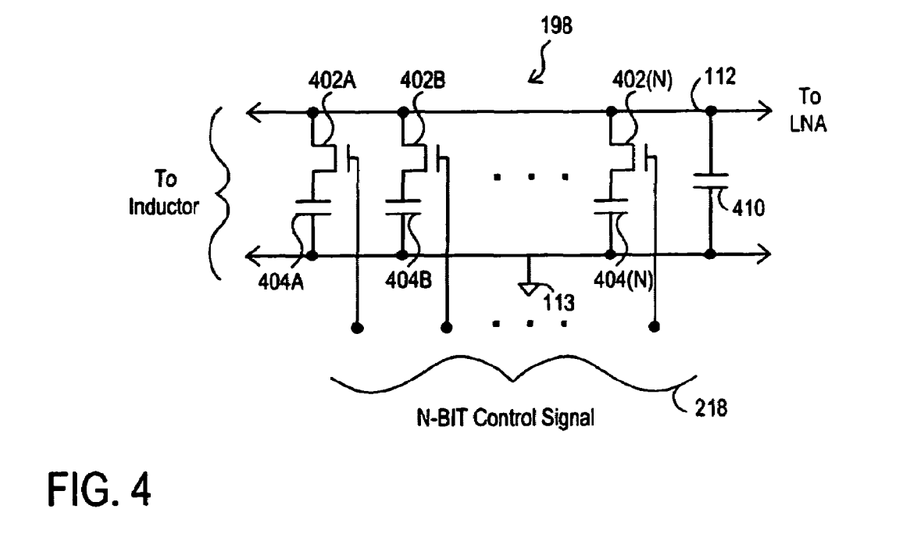
FIG. 4 is a circuit diagram of an example embodiment for a tunable capacitance circuit.

FIG. 4 is a circuit diagram of an example embodiment for a tunable capacitance circuit 198. As depicted, the tunable capacitance circuit 198 includes a plurality of individual capacitance circuits connected in parallel between signal line 112 and ground 113. An inductor 115 is then also coupled in parallel between the signal line 112 and ground 113. Each individual capacitance circuit includes a capacitor and a transistor. For example, transistor 402A and capacitor 404A make up a first capacitance circuit. Transistor 402B and capacitor 404B make up a second capacitance circuit. And transistor 402(N) and capacitor 404(N) make up an Nth capacitance circuit. The N-bit digital control signal 218 provides a control signal to each of the N individual capacitance circuits. These control signals are coupled to the gate nodes of the respective transistors 402A, 402B . . . 402(N). In operation, depending on the state of each bit of the N-bit control signal 218, capacitors 404A, 404B . . . 404(N) are individually switched into the LC filter circuit or excluded from the LC filter circuit. In other words, each of the capacitors 404A, 404B . . . 404(N) can be individually included in or excluded the overall capacitance for the tunable capacitance circuit 198.

It is noted that the capacitors 404A, 404B . . . 404(N) can be weighted in such a way as to facilitate the tuning of the tunable capacitance circuit 198. Possible weighting schemes for these capacitors 404A, 404B . . . 404(N) include identical weights (x, x, x, etc.), geometric weighted (2×, 4×, 8×, etc.), or any other desired weighting scheme. It is also noted that one or more on-chip and/or external capacitors, such as capacitor 410, may be coupled in parallel between signal line 112 and ground 113 such that these capacitors are always included within the capacitance of the LC filter circuit. It is further noted that other on-chip or off-chip variable capacitances, such as varactor diodes or MOS capacitors, could also be utilized to provide a variable capacitance, and capacitance circuits with analog or variable control signals could also be utilized. Examples of a variable capacitance circuitry, including such circuitry that is tunable both through the use of a multiple-bit digital control signal and a plurality of analog control signals, is described in U.S. Pat. No. 6,760,575, which is hereby incorporated by reference in its entirety. It is further noted that other variable or tunable capacitance circuits and associated control signals could also be utilized, if desired, without departing from the present invention.

Further modifications and alternative embodiments of this invention will be apparent to those skilled in the art in view of this description. It will be recognized, therefore, that the present invention is not limited by these example arrangements. Accordingly, this description is to be construed as illustrative only and is for the purpose of teaching those skilled in the art the manner of carrying out the invention. It is to be understood that the forms of the invention herein shown and described are to be taken as the presently preferred embodiments. Various changes may be made in the implementations and architectures. For example, equivalent elements may be substituted for those illustrated and described herein, and certain features of the invention may be utilized independently of the use of other features, all as would be apparent to one skilled in the art after having the benefit of this description of the invention.

What is claimed is:

1. A radio-frequency (RF) receiver having a calibration system for a tunable filter, comprising:

a tunable filter for an RF receiver, the tunable filter being configured to be tuned a desired channel by adjusting one or more tuning control signals, the tunable filter being tunable across a frequency spectrum including a plurality of channels;

calibration signal generation circuitry configured to provide an adjustable calibration signal to the tunable filter in a calibration mode of operation, the calibration signal being adjusted based upon the desired channel to be tuned;

receive path circuitry configured to receive a filtered signal from the tunable filter during a normal mode of operation and a filtered calibration signal from the tunable filter during a calibration mode of operation, the receive path circuitry being further configured to output a feedback signal representing a parameter associated with the filtered calibration signal during a calibration mode of operation; and calibration control circuitry coupled to receive the feedback signal as an input during a calibration mode of operation and to provide the one or more tuning control signals to the tunable filter, the calibration control circuitry being configured to adjust the one or more tuning control signals based upon the feedback signal to tune the tunable filter with respect to the desired channel;

wherein the calibration signal generation circuitry, the receive path circuitry, and the calibration control circuitry are at least in part integrated on the same integrated circuit.

2. The RF receiver of claim 1, wherein calibration signal generation circuitry comprises local oscillator (LO) generation circuitry configured to provide an oscillation signal as an output and calibration signal drive circuitry coupled to receive the oscillation signal and to output the calibration signal to the tunable filter.

3. The RF receiver of claim 2, wherein calibration signal drive circuitry comprises a transconductance amplifier and wherein the calibration signal matches a frequency of the oscillation signal.

4. The RF receiver of claim 2, wherein the receive path circuitry comprises:
a mixer coupled to receive as inputs a mixing signal from the LO generation circuitry and a filtered signal from the tunable filter and having a mixed signal as an output;
conversion circuitry coupled to receive the mixed signal from the mixer and configured to output a digital signal; and
digital-signal-processor (DSP) circuitry coupled to receive the digital signal from the conversion circuitry and configured to output the feedback signal.

5. The RF receiver of claim 4, wherein the LO generation circuitry is coupled to receive a channel selection signal as an input and configured to provide an oscillation signal as an output, the oscillation signal being dependent upon the channel selection signal and being used to generate the mixing signal for the mixer.

6. The RF receiver of claim 1, wherein the tunable filter comprises a tunable capacitance circuit configured to be coupled to an inductor to form an LG filter.

7. The RF receiver of claim 1, wherein the feedback signal represents a strength of the filtered calibration signal.

8. The RE receiver of claim 7, wherein DC offset is utilized to represent the strength of the filtered calibration signal and where the tuning control signals are adjusted to increase the DC offset in a calibration mode of operation.

9. The RE receiver of claim 6, wherein the tunable capacitance circuit comprises a plurality of parallel-connected individual capacitance circuits configured to be controlled at least in part by an N-bit digital control signal.

10. The RE receiver of claim 1, wherein the tunable filter is configured to adjust a response for the filter within a desired frequency band based upon the one or more tuning signals.

11. The RE receiver of claim 10, wherein the desired frequency band is an FM or AM audio broadcast band.

12. An filter calibration system for a radio-frequency (RF) receiver, comprising:
a tunable filter configured to be tuned to a desired channel by adjusting one or more tuning control signals, the tunable filter being tunable across a frequency spectrum including a plurality of channels;
a calibration signal generator coupled to provide an adjustable calibration signal to receive path circuitry in a calibration mode of operation, the calibration signal being adjusted based upon the desired channel to be tuned; and calibration control circuitry coupled to receive a feedback signal from the receive path circuitry during a calibration mode of operation and to provide the one or more tuning control signals to the tunable filter, the calibration control circuitry being configured to adjust the one or more tuning control signals based upon the feedback signal to tune the tunable filter with respect to the desired channel;

wherein the calibration signal generator and the calibration control circuitry are at least in part integrated on the same integrated circuit.

13. The filter calibration system of claim 12, wherein the tunable filter comprises a tunable capacitance circuit coupled to an inductor to form an LC filter.

14. The filter calibration system of claim 13, wherein the tunable capacitance circuit is at least in part integrated on the same integrated circuit as the integrated calibration signal generator and calibration control circuitry.

15. The filter calibration system of claim 14, further comprising an integrated inductor coupled to the tunable capacitance circuit.

16. The filter calibration system of claim 13, wherein the tunable capacitance circuit comprises a plurality of parallel-connected individual variable capacitance circuits having at last one control input.

17. The filter calibration system of claim 13, wherein the tunable capacitance circuit is configured to adjust a response for the LC filter within a desired frequency band based upon the one or more tuning signals.

18. The filter calibration system of claim 17, wherein the desired frequency band is an FM or AM audio broadcast band.

19. A method for calibrating a tunable filter, comprising:
generating an adjustable calibration signal based upon a desired channel to be tuned;
filtering the calibration signal with a tunable filter having a center frequency that is dependent at least in part upon one or more tuning control signals, the tunable filter being tunable across a freciuency spectrum including a plurality of channels;
processing the calibration signal with receive path circuitry to generate a digital signal;
analyzing one or more parameters associated with the digital signal;
adjusting the tuning control signal based upon the one or more parameters to tune the tunable filter with respect to the desired channel; and
repeating the filtering, processing, analyzing and adjusting steps until a desired result is achieved with respect to the parameter associated with the digital signal;
wherein the generating, filtering, processing, analyzing and adjusting steps are at least in part performed within a single integrated circuit.

20. The method of claim 19, wherein the filtering step comprises utilizing an inductor coupled to a tunable capacitance circuit to form an LC filter, the tunable capacitance circuit being adjusted using the one or more tuning control signals.

21. The method of claim 20, wherein the tunable capacitance circuit is at least in part integrated within the single integrated circuit.

22. The method of claim 21, wherein the tunable capacitance circuit comprises a plurality of parallel-connected individual capacitance circuits configured to be controlled at least in part by an N-bit digital control signal and integrated within the single integrated circuit.

23. The method of claim 19, wherein the processing step comprises mixing the calibration signal with a mixing signal to generate an output signal and converting the output signal to a digital signal.

24. The method of claim 23, further comprising generating a mixing signal with local oscillator (LO) generation circuitry, the mixing signal being dependent upon a desired channel to be tuned, and utilizing the mixing signal to generate the calibration signal.

25. The method of claim 24, wherein a frequency of the calibration signal matches a frequency of the mixing signal.

26. The method of claim 19, wherein the one or more parameters comprises a feedback signal representing a strength of the filtered calibration signal.

27. The method of claim 26, wherein DC offset is utilized to represent the strength of the filtered calibration signal and where the tuning control signals are adjusted to increase the DC offset in calibration mode of operation.

28. The method of claim 19, wherein an input signal spectrum to the tunable filter is an FM or AM audio broadcast band.

29. The method of claim 19, further comprising, after the repeating step has completed, receiving a signal spectrum and outputting signals related to a desired channel.

* * * * *

UNITED STATES PATENT AND TRADEMARK OFFICE
CERTIFICATE OF CORRECTION

PATENT NO. : 7,127,217 B2  Page 1 of 1
APPLICATION NO. : 11/081959
DATED : October 24, 2006
INVENTOR(S) : G.Tyson Tuttle et al.

It is certified that error appears in the above-identified patent and that said Letters Patent is hereby corrected as shown below:

Column 13, line 39, delete "LG" and insert --LC--.

Column 13, line 42, delete "RE" and insert --RF--.

Column 13, line 46, delete "RE" and insert --RF--.

Column 13, line 50, delete "RE" and insert --RF--.

Column 13, line 54, delete "RE" and insert --RF--.

Column 14, line 39, delete "freciuency" and insert --frequency--.

Signed and Sealed this

Ninth Day of January, 2007

JON W. DUDAS
*Director of the United States Patent and Trademark Office*